May 8, 1934.  E. E. MOTTER  1,957,550
TRANSMISSION FOR MOTOR CARS AND CONTROL MEANS THEREFOR
Filed Feb. 18, 1932   8 Sheets-Sheet 1

INVENTOR
Elmer Eidemiller Motter.

May 8, 1934.   E. E. MOTTER   1,957,550
TRANSMISSION FOR MOTOR CARS AND CONTROL MEANS THEREFOR
Filed Feb. 18, 1932   8 Sheets-Sheet 2

INVENTOR
Elmer Eidemiller Motter.

May 8, 1934.  E. E. MOTTER  1,957,550
TRANSMISSION FOR MOTOR CARS AND CONTROL MEANS THEREFOR
Filed Feb. 18, 1932  8 Sheets-Sheet 3

INVENTOR
Elmer Eidemiller Motter.

May 8, 1934. E. E. MOTTER 1,957,550
TRANSMISSION FOR MOTOR CARS AND CONTROL MEANS THEREFOR
Filed Feb. 18, 1932 8 Sheets-Sheet 4

INVENTOR
Elmer Eidemiller Motter.

INVENTOR
Elmer Eidemiller Motter.

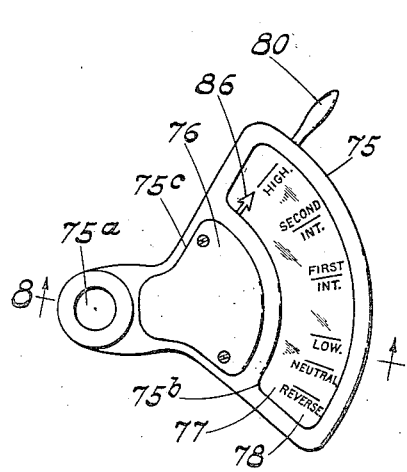
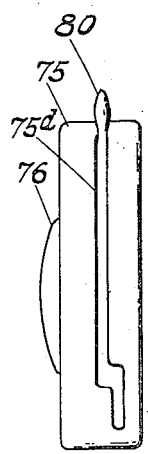
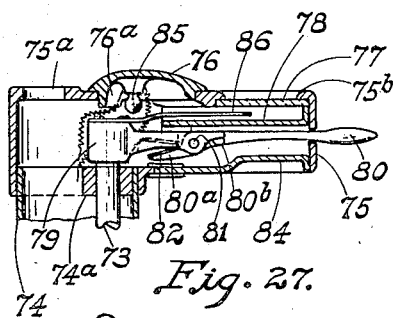
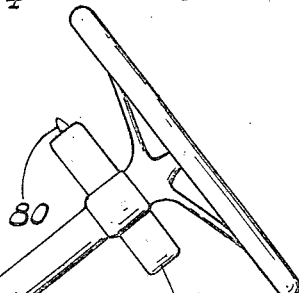
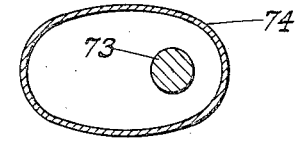
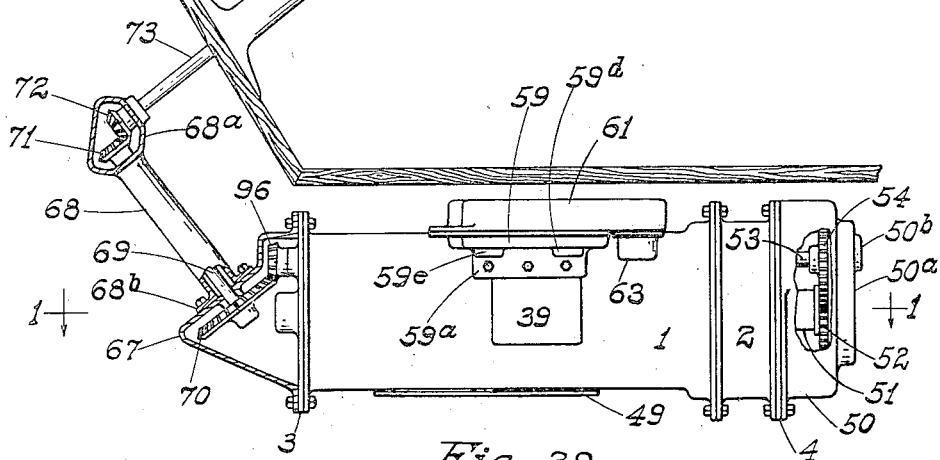

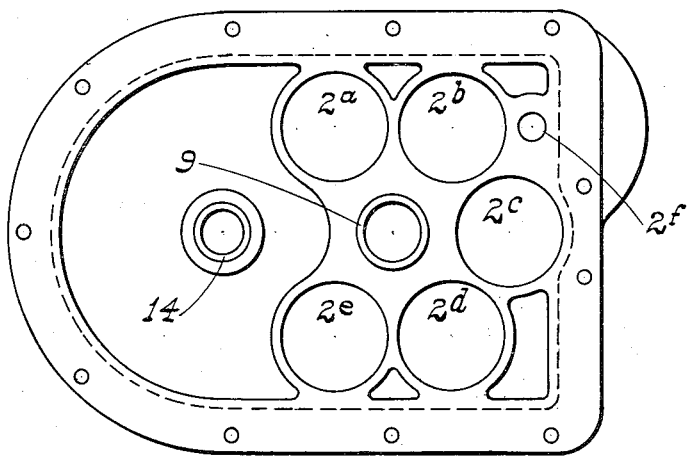
Fig. 30.
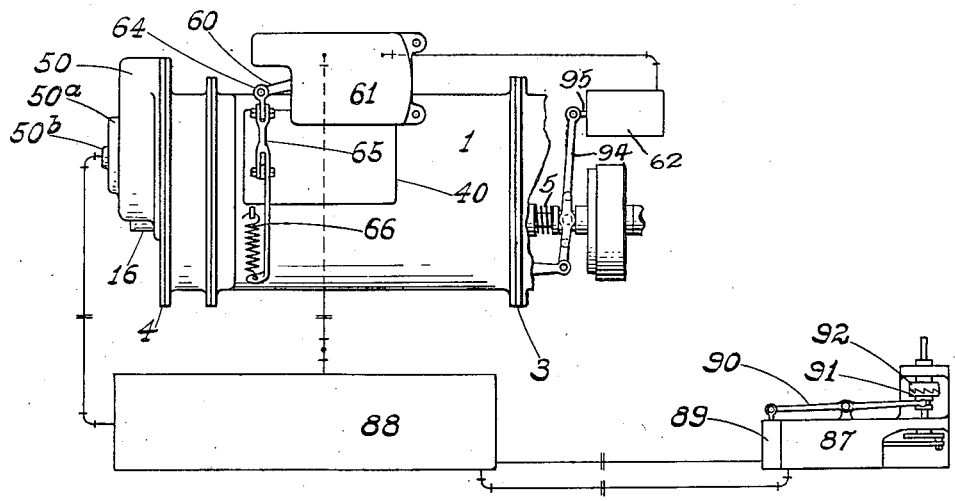
Fig. 31.
Fig. 32.

May 8, 1934.  E. E. MOTTER  1,957,550
TRANSMISSION FOR MOTOR CARS AND CONTROL MEANS THEREFOR
Filed Feb. 18, 1932   8 Sheets-Sheet 8

INVENTOR
Elmer Eidemiller Motter.

Patented May 8, 1934

1,957,550

UNITED STATES PATENT OFFICE 1,957,550

TRANSMISSION FOR MOTOR CARS AND CONTROL MEANS THEREFOR

Elmer Eidemiller Motter, Pleasant Ridge, Mich.

Application February 18, 1932, Serial No. 593,797

11 Claims. (Cl. 74—59)

This invention relates to an improved type of transmission for motor cars or vehicles and to improved means of controlling same.

The object of the invention is to provide for the operators of motor cars or vehicles, the maximum in ease of manipulation relative to the starting, stopping, and changing of speed or condition of motion thereof.

Another object is to provide the maximum in comfort for operators of motor cars or vehicles, as this invention eliminates the regular clutch pedal and makes possible the use of small and easily operated brake pedals.

Another object is to have clear floor space, which is accomplished by the elimination of the gear shift lever now in use.

A still further object or result of this invention is a foot board that, on account of the type of small brake pedals that can be used, will exclude cold air from the car or vehicle during cold weather.

A still further object is to provide compressed air for tire inflation and other possible uses, whenever and wherever it is needed.

With the above objects in view and which will be apparent as the description proceeds, the invention resides in the combination and arrangement of parts and in the details of construction, hereinafter described and claimed, it being understood that the right is reserved to make such changes in the precise embodiment of the invention as fairly fall within the scope of what is specified and claimed.

In the accompanying drawings, which form a part of this specification, and in which reference characters for the different parts correspond with the specification wherever they occur—

Fig. 1 is a plan view of assembled parts in the transmission casing, and a portion of the compressed air distributor casing. The transmission casing and some other parts are shown in section taken on line 1—1 of Fig. 29 but the scale is larger than that of Fig. 29. One bearing of the transmission casing is not shown in section, while some parts are partially broken away down to the said line 1—1. Parts supported in the upper part of casing are omitted.

Fig. 25 is a view of the control lever and indicator casing as seen from the viewpoint of the operator of a car in which it is installed. The scale used is smaller than that of Fig. 1.

Fig. 26 is a side elevation of the said control lever and indicator casing, relative to the view shown by Fig. 25.

Fig. 27 is a sectional view of the said control lever and indicator casing, the section being taken on the line 8—8, Fig. 25.

Fig. 28 is a cross section of the type of steering column to be used with this invention and the transmission control shaft therein. The scale used is larger than that of the indicator casing views.

Fig. 29 is a side elevation of the transmission casing, air distributor casing, air valve, gear case and also the steering column and indicator casing with portions of the gear case and compressed air distributor casing broken away to show parts therein. A portion of the floor and foot boards of the car are also shown and the scale used is smaller than that of Fig. 25 and Fig. 26.

Fig. 30 is a front elevation of a part of the transmission casing.

Fig. 31 is a partially diagrammatic view showing parts that are to be used in combination with the transmission. The transmission casing, air valve, and air distributor casing are shown to a smaller scale than that of Fig. 29 while the other parts are merely in the form shown for diagram purposes, and without regard to the preferred types thereof to be used.

Fig. 32 is a perspective view of a portion of the foot board of a car body with a portion of the steering column and transmission control shaft which are parts of this invention. A small accelerator pedal is shown. Also small brake pedals such as can be used in connection with the invention are also shown.

Figure 33:
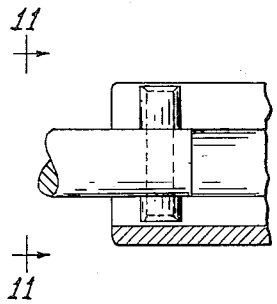
Figure 34:
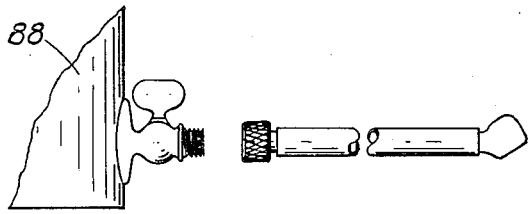
Figure 35:
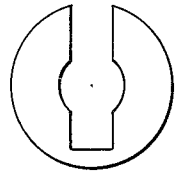
Figure 36:
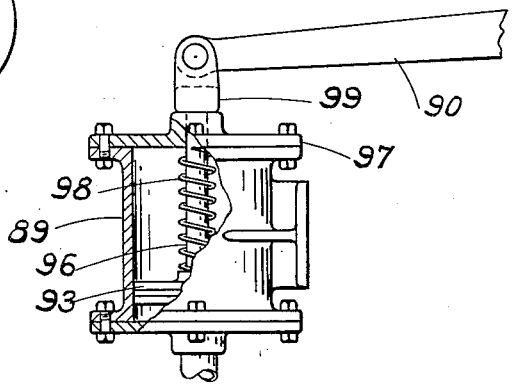
Figure 37:
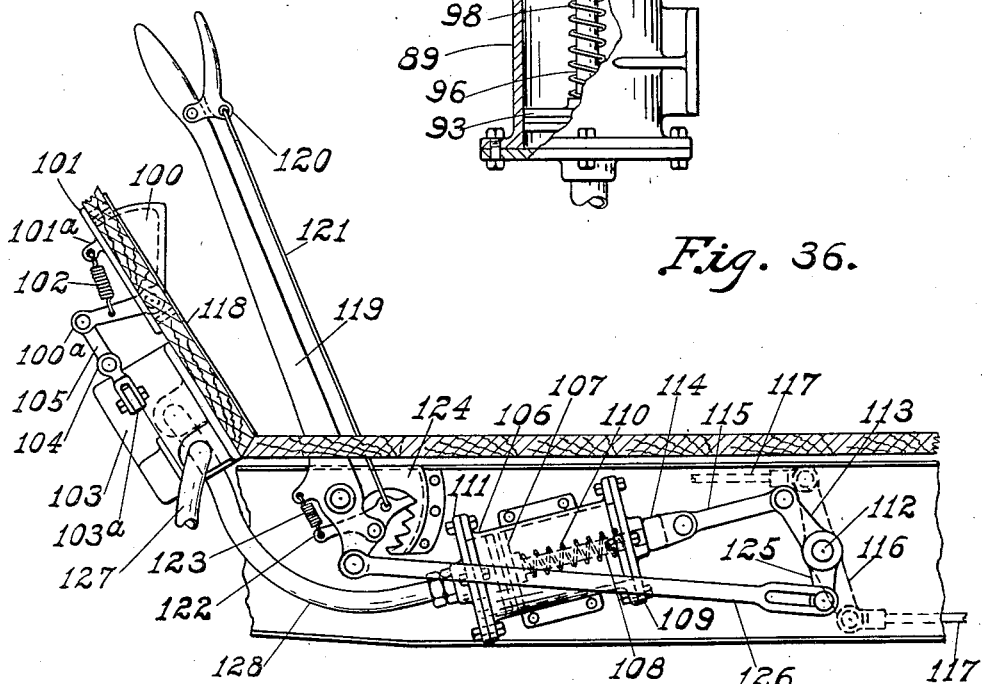

Figure 33 is a sectional view showing a preferred anti-friction method of preventing any rotation of the piston rods in their slide bearings. Figure 34 is a view of a portion of the compressed air storage tank showing a valve thereon and an air hose (mostly broken away) adapted to be attached to said valve for the purpose of inflating tires or for other uses. Figure 35 is an end view of one of the piston rod slide bearings on line 11—11 of Figure 33, and showing grooves or ways in which rollers rotatably mounted on the piston rod are adapted to travel. Figure 36 is a side elevation of the pressure regulating cylinder and part of its cooperating parts which are also partly shown by Figure 31 and which serve in air pressure regulation. A portion of a lever is shown broken away and a portion of the cylinder is also broken away to show the parts therein. The parts used for the operation of the main clutch of the motor car are similar to these pressure regulating parts. Figure 37 is a side elevation of the emergency brake operating mechanism showing the floor and foot board of the car body in section and also showing a portion of the frame side member of the car chassis.

Figure 1:
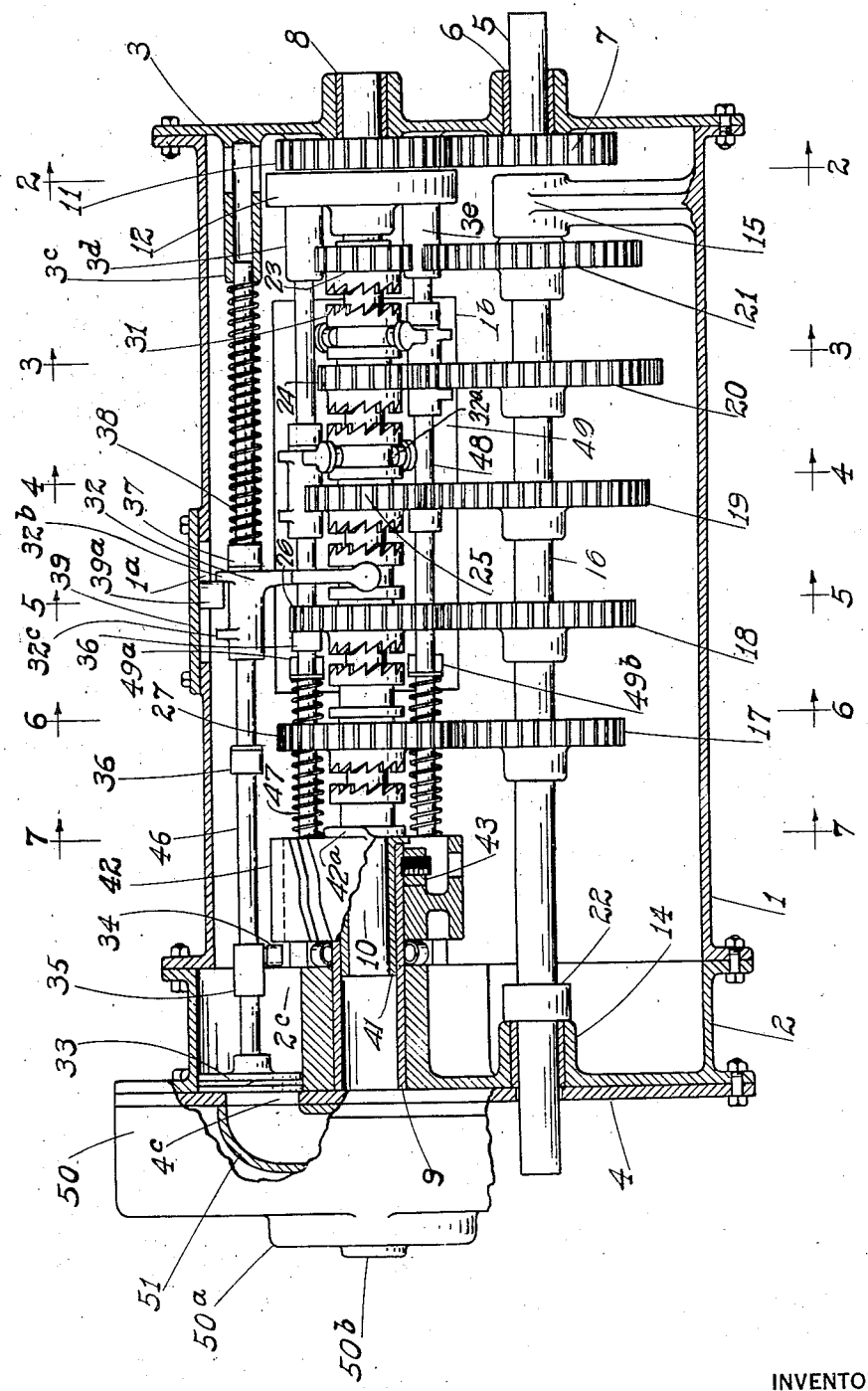

The transmission casing is composed of the main body 1, and the end pieces 2 and 3 which are all bolted together as shown by Fig. 1. Proper gaskets are to be used in the joints to render the assembled casing oil-tight. In a bearing 6, in the end piece 3 is rotatably mounted the shaft 5. This shaft 5 has rigidly secured to its inner end the gear 7. In a bearing 8 in the casing member 3 and in a bearing 9 in the casing member 2 is rotatably mounted the countershaft 10.

Figure 2:
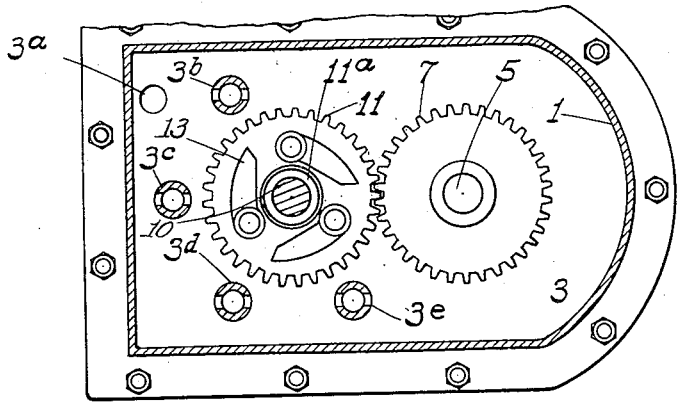
Fig. 2 is a transverse section of the transmission casing on line 2—2, Fig. 1 and looking in the direction indicated by the arrows.
Figure 4:
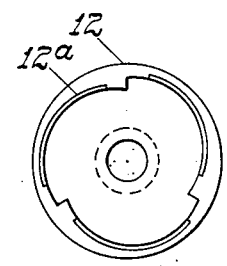
Fig. 4 is an elevation of an internal ratchet wheel, which may be used in the transmission.
Figure 6:
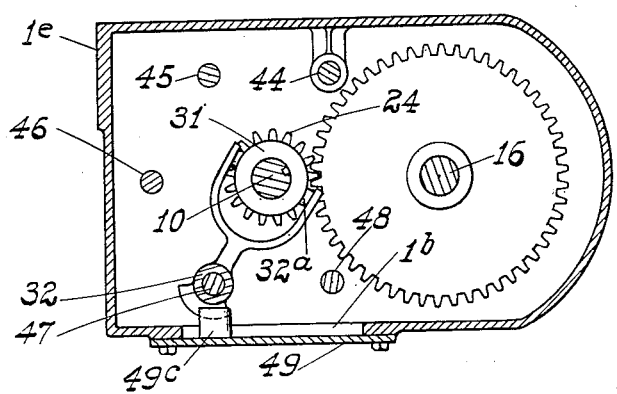
Fig. 6 is also a transverse section of the transmission casing on the line 4—4, Fig. 1.
Figure 7:
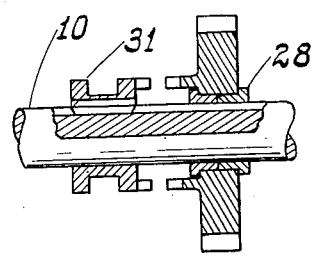
Fig. 7 is a section of one of the gears and clutch members on the countershaft, with a portion of the countershaft also shown in section.
Figure 8:
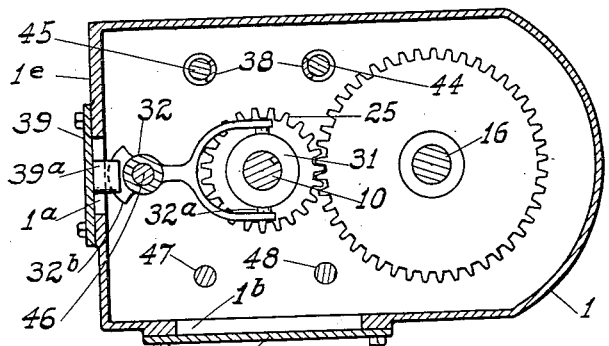
Fig. 8 is also a transverse section of the transmission casing on line 5—5, Fig. 1.

On this countershaft 10 is mounted, freely rotatable, the gear 11, which is adapted to mesh with the gear 7 which is rigidly secured to the shaft 5. Adjacent this gear 11 on the countershaft 10, the internal ratchet wheel 12 is rigidly secured to the said countershaft 10. The gear 11 has a plurality of pawls 13 pivotally secured to it (Fig. 2), the said pawls being adapted to properly engage the teeth of the internal ratchet wheel 12 (Fig. 4).

The gear 11 has a hub 11ª, which is covered with suitable sound insulation to acquire silence in the contact of the pawls 13 therewith. The internal ratchet wheel 12 has sound insulating pads 12ª of proper extent, formation and attachment to secure silence in operation.

In a bearing 14 in the casing member 2 and in a bearing 15 secured to, or formed with the casing member 1, is rotatably mounted the transmission shaft 16. To this shaft 16, at the proper points, are secured the gear wheels 17, 18, 19, 20, and 21. This shaft 16 is held at its proper place in the casing by the gear 21, which is adjacent the bearing 15 and by the set-collar 22, which is adjacent the bearing 14. This shaft 16 has an end extending from the rear end of the casing, to which the front universal joint of the car is rigidly secured. Also the shaft 5 has its outer or front end extending from the casing and adapted to carry, properly mounted the releasable element of the main clutch of the car. For convenience in assembling, the countershaft 10 has a key-way extending from its end, which is supported by the bearing 9 to a point adjacent the gear 23 hereinafter specified.

A two-part sleeve 28, after first having the gear 23 mounted freely rotatable on it, is mounted on the countershaft 10 so as to bring the said gear 23 in line with the gear 21 on the shaft 16. This two-part sleeve 28 is made tight fitting on the shaft 10 so that by virtue of its flanges it will retain the gear 23 in line with the gear 21. An inwardly extending part 1ᵈ, in which is rigidly mounted the stud shaft 29, is either formed with the casing member 1 or secured to it as a separate part. On this stud shaft 29 is rotatably mounted the gear 30 in line with and adapted to mesh with the gears 21 and 23. These three gears serve for the reverse motion of the car. The gear 23 has a clutch jaw formed on one side of it as shown by Fig. 1.

A clutch member 31, having a spline to fit properly in the key-way in the countershaft 10, is slidably mounted on the said countershaft 10. The jaw of this clutch member 31 is adapted to properly fit the jaw on the gear 23, the said parts 23 and 31 thereby constituting a jaw-clutch to serve in the reverse function of the car.

This clutch member 31 has a peripheral groove adapted to be engaged by a pair of rollers 32ª on the clutch-shifter 32 as hereinafter set forth. Such metals or materials are to be used in these clutch members, that their engagement is rendered silent. After the clutch member 31 has been put on the shaft 10 the gear 24 is mounted on the countershaft 10 (in like manner to the gear 23) in line with and adapted to mesh with the gear 20, which is mounted on the transmission shaft 16.

Then another clutch member 31 is mounted on the countershaft 10 and its jaw is likewise adapted to properly fit a jaw on the gear 24. In like manner the gears 25, 26 and 27 and their individual clutch members 31 are mounted on the countershaft 10. The gears 25, 26 and 27 are adapted to mesh respectively with the gears 19, 18 and 17, which are mounted on the shaft 16.

The casing member 2 (Fig. 30) has cylinders formed in it, equidistant from and parallel to the bearing 9.

Referring to Fig. 1 a piston 33 is mounted in cylinder 2ᶜ of the casing member 2, the said piston 33 having a piston-ring in the usual manner. The rod 46, on one end of which the piston 33 is rigidly mounted, has its other end slidably supported in a bearing 3ᶜ in the casing member 3. This bearing 3ᶜ has apertures adjacent the part 3 to prevent air binding of the rod 46 in its sliding movement. Anti-friction means are to be provided for preventing any rotation of the said rod 46 in its bearing 3ᶜ.

The block 35, collar 36, clutch shifter 32, another collar 37 and the compression spring 38 are placed on the rod 46 before its end is entered in place in the bearing 3ᶜ. A rectangular opening 1ᵃ of proper size and location is provided in the casing member 1. This opening 1ᵃ is provided with a cover plate 39, which is secured to the said casing member 1 by tap bolts. This cover plate 39 has on its inner side a lug or rigidly mounted pin 39ᵃ, which has sound insulation around it.

The clutch shifter 32 has a pair of rollers 32ᵃ, which are mounted and retained, freely rotatable, on pins projecting from the inner surface of its yoke shaped portion. It also has projections 32ᵇ and 32ᶜ, which are adapted to engage the lug 39ᵃ of the cover plate 39. The opening 1ᵃ in the casing member 1 is so located that the projection 32ᵇ of the clutch shifter 32 abuts against the lug 39ᵃ of the cover 39, when the said clutch shifter 32 is at the rearward limit of its movement and the clutch which it controls is consequently in disengaged condition. The other projection 32ᶜ of the clutch shifter 32 is so located thereon that it abuts against the lug 39ᵃ of the cover plate 39 when the said shifter 32 is at the forward limit of its movement and the clutch, which it controls is in engaged condition. The collars 36 and 37 have sound insulation on one face as shown.

The collar 36 is rigidly secured to the rod 46 at such a point that the sum of the distance between it and the clutch shifter 32 (when said shifter is at its rearward limit) and the distance represented by the allowed travel of the said clutch shifter 32 are equal to the total travel of the piston 33 in the cylinder 2ᶜ.

The collar 37 is secured to the rod 46 so that it abuts against the clutch shifter 32, when the clutch is in disengaged condition and when the rod 46 carrying the piston 33 is at the rearward limit of its movement.

The compression spring 38 is adapted to be compressed between the collar 37 and the bearing 3ᶜ. Access to the collar 37 for final adjustment and fastening to the rod 46 is provided by the opening 1ᵃ in the casing member 1. The block 35 and the collar 36 are rigidly secured to the rod 46 before the said rod is put in place in the casing members 1, 2 and 3.

Figure 3:
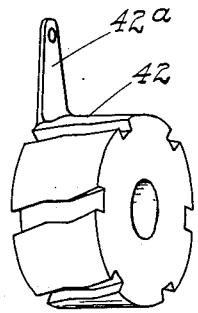
Fig. 3 is a perspective view of the regulator and air valve actuator.
Figure 5:
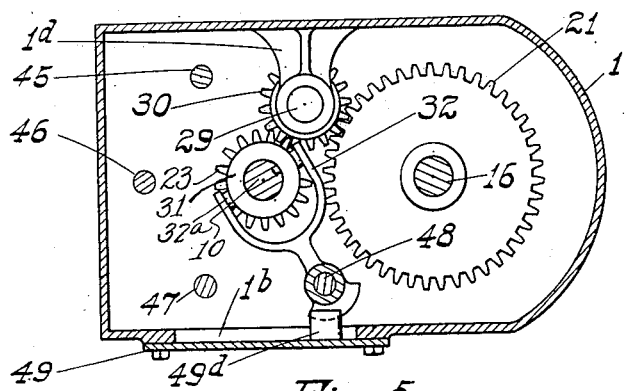
Fig. 5 is also a transverse section of the transmission casing on the line 3—3, Fig. 1.

The bearing 9 in the casing member 2 is made of such a length that it projects inwardly from the said part 2 and not only provides bearing for the sleeve 41, which is tightly fitted on the end of the countershaft 10, but also serves as a spindle on which is mounted the air-valve actuator 42 (Fig. 3).

Figure 9:
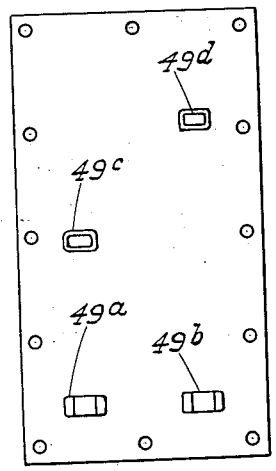
Fig. 9 is a plan view of a cover for an opening in the bottom of the transmission casing.
Figure 10:
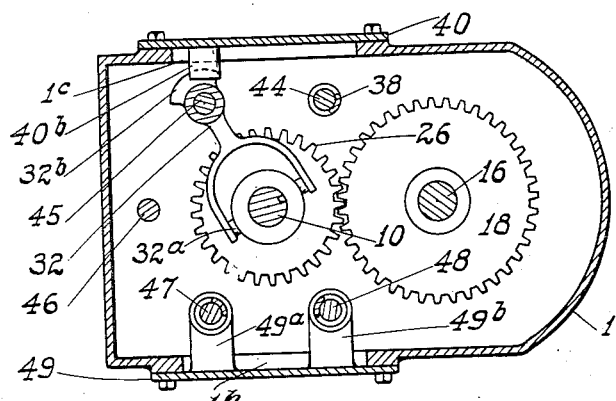
Fig. 10 is also a transverse section of the transmission casing on the line 6—6, Fig. 1.
Figure 11:
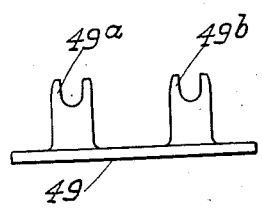
Fig. 11 is an end elevation of the cover plate shown by Fig. 9.
Figure 12:
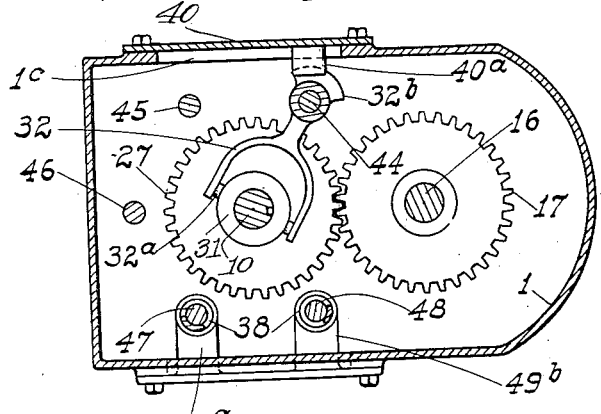
Fig. 12 is a transverse section of the transmission casing on the line 7—7, Fig. 1.
Figure 13:
Fig. 13 is a partial section showing a type of air baffle that may be used to prevent air leakage in the compressed air valve or the air distributor elements.
Figure 14:
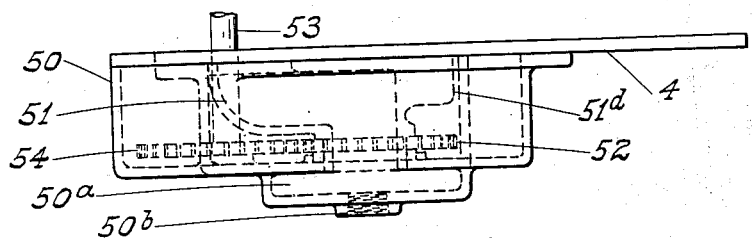
Fig. 14 is a plan view of the compressed air distributor casing with the compressed air distributor shown therein.

This bearing 9 is also of such a length that space is provided thereon for a set-collar 43 for the purpose of retaining the said part 42 thereon. The sleeve 41 on the countershaft 10 has a flange to abut against the bearing 9 to prevent endwise movement of the countershaft in that direction. As the internal ratchet 12 is rigidly secured to the countershaft 10 and as there is only proper running clearance between it and the hub 11ᵃ on the gear 11 and also between the said gear 11 and the bearing 8, the said countershaft 10 is thereby held in place endwise. The block 35 has a roller 34 mounted on one of its faces and is rigidly secured on the rod 46, in such a position that the axis of the roller 34 lies in a radial plane emanating from the center of the countershaft 10. The block 35 is also so located on the rod 46 that the roller 34 is in position to be in contact with the rearward face of the air valve actuator 42 when the piston 33 is at the extreme rearward limit of its movement. In like manner to the rod 46, each of the rods 45, 47 and 48 carries a piston like the piston 33, the said pistons to operate respectively in the cylinders 2ᵇ, 2ᵈ and 2ᵉ. These rods 45, 47 and 48 have their other ends slidably supported respectively in the bearings 3ᵇ, 3ᵈ and 3ᵉ of the casing member 3 and also are to have anti-friction means of preventing any rotation in the said bearings. The rod 44 is also rigidly secured in a piston like the piston 33 and the piston on this rod 44 operates in the cylinder 2ᵃ. The other end of this rod 44 is supported in a bearing secured to the casing member 1 and in like manner to the rods 45, 46, 47 and 48. The rods 44, 45, 47 and 48 also carry clutch shifters like the shifter 32 to operate the clutch members which belong respectively to the gears 27, 26, 24 and 23. The casing member 1 has a large opening 1ᵇ in its bottom and a cover plate 49 (Fig. 9) provides closure for said opening.

This cover plate 49 has on its inward side two slotted projections 49ᵃ and 49ᵇ through which operate respectively the rods 47 and 48. This cover plate 49 also has two lugs 49ᶜ and 49ᵈ like the lug 39ᵃ on the cover plate 39, and so located thereon that they perform like functions for the clutch shifters on the respective rods 47 and 48. The rods 44, 45, 47 and 48 have collars mounted on them in like manner to the rod 46 and for a like purpose thereto.

Between the roller carrying blocks 35 which are rigidly mounted on the rods 47 and 48 (as hereinafter specified) and the projections 49ᵃ and 49ᵇ on the cover plate 49, compression springs (similar to the spring 38) are mounted on the said rods 47 and 48. The rods 44 and 45 also carry compression springs for a like purpose to those on the rods 46, 47 and 48.

Each of the rods 44, 45, 47 and 48 has mounted on it in exactly the same manner as on the rod 46, a roller carrying block like the block 35 on the said rod 46.

The air valve actuator 42, which is mounted, partially rotatable on the spindle 9, has five grooves in its outer surface (Fig. 3) so located, that the rollers on the blocks that are mounted on the rods 44, 45, 46, 47 and 48 will register with the rearward ends of the five grooves in the said actuator 42 at the moment when all of the rods are at the rearward limit of their movement. This part 42 also has an upwardly extending arm 42ᵃ which projects through a slot provided for it in the top of the casing member 1 or in a cover plate 40 thereof.

The lug 39ᵃ on the cover plate 39 and the lugs 49ᶜ and 49ᵈ on the cover plate 49 serve as stops to properly limit the movement of the clutch shifters which are mounted respectively on the rods 46, 47 and 48.

The top cover plate 40 for the casing opening 1ᶜ also has two lugs 40ᵃ and 40ᵇ (like the lug 39ᵃ on the cover plate 39) properly located on its inward surface to properly limit the movement of the clutch shifters on the rods 44 and 45. Gaskets are used between the casing member 1 and the cover plates 39, 40 and 49.

The compressed air distributor casing member 4 has a plurality of like orifices 4ª, 4ᵇ, 4ᶜ, 4ᵈ and 4ᵉ of proper shape and size in it, and they are so arranged in it, that they provide ports for the cylinders in the transmission casing member 2. Another air distributor casing member 50 is bolted to the transmission casing adjacent and along with the casing member 4, after the parts that belong therein are properly assembled therein as hereinafter specified.

The compressed air distributor 51 has two spindles 51ª and 51ᵇ on which it is mounted partially rotatable in its casing. The one spindle 51ª has bearing accommodation in the casing member 4, while the other has bearing accommodation in the casing member 50. This compressed air distributor, which is a hollow part, is adapted to receive compressed air through its hollow spindle 51ᵇ and deliver it through its port 51ᶜ to any of the ports 4ª, 4ᵇ, 4ᶜ, 4ᵈ and 4ᵉ in the port plate member of the compressed air distributor casing. The distributor 51 is provided with a counterbalance 51ᵈ to make it a perfectly balanced part whatever its position may be. This compressed air distributor 51 also has a pair of lips or ledges 51ᵉ to prevent any loss of air pressure at certain points of its movement. The spindle 51ᵇ of this air distributor 51 has secured to it a gear 52. A shaft 53 is rotatably mounted in bearings 3ª and 2ᶠ in the transmission casing members 3 and 2. This shaft 53 has rigidly secured to one end a gear 54 which is adapted to mesh with the gear 52. The other end of this shaft 53 has a bevel pinion 96 rigidly secured to it.

The compressed air distributor casing member 50 has a circular ridge 50ᵈ on its inner surface, which in conjunction with the spindle 51ᵇ of the distributor 51 provides accommodation for a ring of oil soaked compressed felt or other more suitable material. With the compressed air distributor casing bolted in place and the other parts assembled in place therein as specified, this ring 55 is adapted to bear against the gear 52 for the purpose of securing an air-tight joint between the said air distributor 51 and the compressed air receiving chamber 50ª of the air distributor casing member 50.

A port 50ᵇ provides the means through which the chamber 50ª is supplied with compressed air. The contacting surfaces throughout are to be finely finished to acquire, not only the maximum in ease of manipulation for operators of motor cars, but also in silence of operation.

Figure 15:
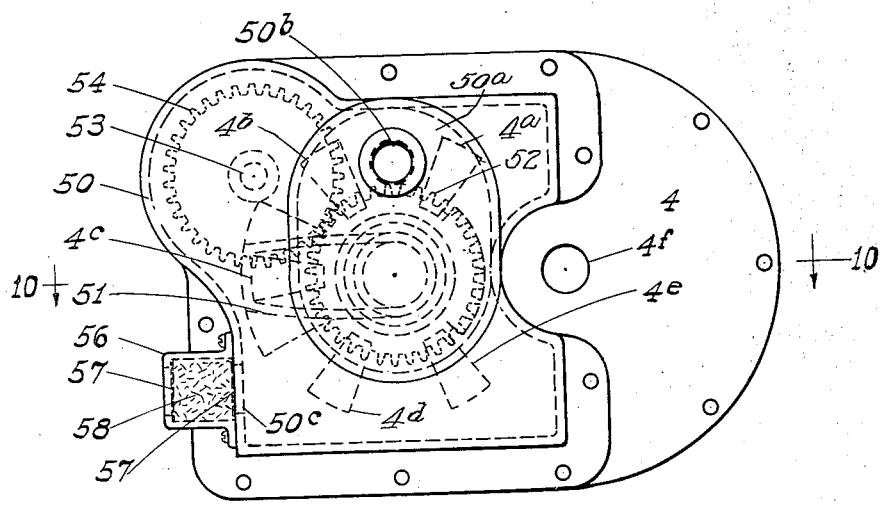
Fig. 15 is a rear elevation of the compressed air distributor casing showing also the distributor and its operating gears therein and the air filter member secured thereto.
Figure 16:
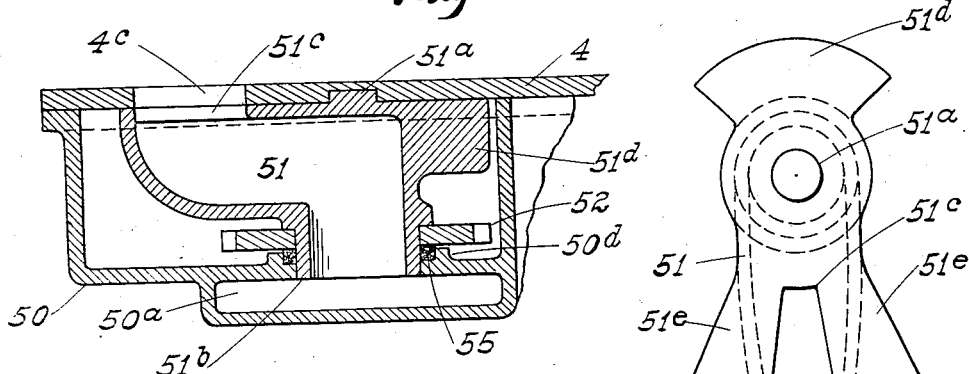
Fig. 16 is a partial horizontal section of the compressed air distributor in its casing, said section being taken on line 10—10, Fig. 15 and the scale is larger than that of Fig. 15.
Figure 17:
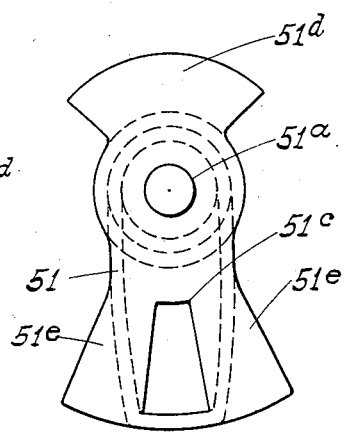
Fig. 17 is a front elevation of the compressed air distributor on a larger scale than the other views showing it.

The casing member 4 has a clearance hole 4ᶠ for the shaft 16 or the said member 4 may be altered to coincide entirely with the outline of the casing member 50 (Fig. 15).

A port 50ᶜ is provided at a proper location in the casing member 50. A box-like part 56 is secured to the said casing member 50, so as to cover the port 50ᶜ. This part 56 has a pair of perforated plates 57 for the purpose of retaining air filtering and silencing material 58 therein.

This port 50ᶜ is for the purpose of permitting air that has been used, to escape, and the function of the part 56 is not only to exclude dirt and dust from the compressed air distributor casing, but also to serve as a silencer of any noise of emitted air.

Figure 18:
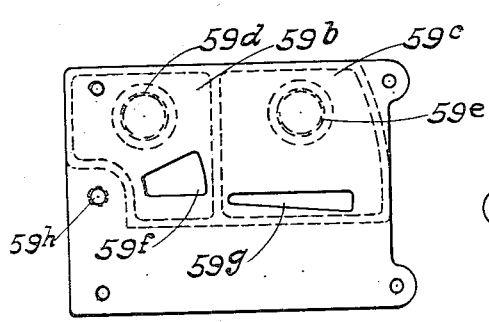
Fig. 18 is a plan view of the stationary part of the main clutch control or transmission air valve.

A specially constructed compressed air valve for meeting the requirements of the transmission is shown by Figs. 18, 19, 20, 21, 22, 23 and 24. The basis of this special valve is its stationary part 59, which has a pad 59ª by which it is secured to a pad 1ᵉ on the transmission casing. This part 59 has two air chambers 59ᵇ and 59ᶜ, which are separate from each other (Fig. 18).

Compressed air is admitted into chamber 59ᵇ through a pipe screwed into the boss 59ᵈ and leaves the valve from the chamber 59ᶜ through a pipe screwed into the boss 59ᵉ. The top surface of this part 59 is a finely finished plane surface and has a port 59ᶠ for the entry chamber 59ᵇ and a port 59ᵍ for the exit chamber 59ᶜ. Each of said ports 59ᶠ and 59ᵍ is to have the proper size and shape to register and function properly with ports in the under side of the part 60, which is pivotally secured to the part 59 by suitable means at 59ʰ.

This pivoted part 60 has a chamber 60ª with two ports therefor in its polished under surface. The one port 60ᵇ is adapted to properly function with the port 59ᶠ, while the other port 60ᶜ is adapted to properly function with the port 59ᵍ. This part 60 has a ledge 60ᵈ of proper size and shape to prevent air loss at a certain point of its movement. The part 60 also has a ledge 60ᵉ, and an arm by which it is operated. It may be desirable to use a roller (instead of the ledge 60ᵉ), so mounted on the said part 60 that it would be adapted to roll along under an arc shaped ledge on the under side of the cover 61. A counterbalance to counteract an unstable tendency may be provided on the operating arm of the part 60. The arc shaped ledge 61ª on the under side of the cover 61 is for the purpose of keeping the pivoted part 60 in proper working contact with the part 59.

The cover 61 is adapted to fit closely to the part 59 and to the part 60, where necessary, to keep the working surfaces of the valve clean. The cover 61 is bolted to the part 59 and has a port 61ᵇ, through which air can escape from the valve after it has performed its service in the cylinder 62, hereinafter mentioned.

A box-like part 63, similar to the part 56 on the compressed air distributor casing, performs a like service for the compressed air valve just described.

The operating arm of the air valve part 60 is properly connected to the arm 42ª of the air valve actuator 42 by means of a swivel part 64 and the link 65.

A tension spring 66 has one end secured to an eye in the link 65 and the other end secured to the top of the transmission casing member 1.

A gear case 67 is secured to the transmission casing as shown by Fig. 29. This gear casing 67 will be shaped to suit the engine and clutch casings of different makes of motor cars in which the invention is installed, and consequently will vary for different cars. The front flange of the transmission casing is to be bolted directly to a suitable flange provided on the engine or main clutch casing of the car and the said transmission casing is to be further supported by steel gussets secured to the frame side members of the car and to special lugs or the flanges of the said transmission casing. Another shaft and gear casing 68 is bolted to the gear casing 67 forming therewith a two part gear case. This gear casing 68 has suitable bearing accommodation for a shaft 69, a flange 68ᵇ at its lower end by which it is mounted, and accommodation for gears in its upper end.

This shaft 69 has rigidly secured to its lower end a bevel gear 70 adapted to mesh with the bevel pinion 96, which is rigidly mounted on the compressed air distributor operating shaft 53 as previously specified. To the upper end of this shaft 69 is rigidly secured the bevel or miter gear 71. A removable cover is provided for the gear cavity 68ª of the said part 68, to provide access to the gears 71 and 72.

Instead of the type of steering column ordinarily used, I provide a steering column of a shape shown by Fig. 28 or other shape such as will provide not only space for the steering and other functions of a motor car, but also space for a transmission control shaft 73.

The steering column 74 is secured by a suitable base in the proper position in the body of the motor car.

To the upper end of this steering column is secured the control lever and indicator casing 75 (Fig. 29) in a neat and substantial manner. This part 75 has accommodation for the steering function of the car and its main body is shaped like the sector of a circle whose center is the center of the shaft 73. A suitable bearing 74ª for the said transmission control shaft 73 is secured in the upper end of the said steering column 74.

The lower end of this shaft 73 has bearing accommodation in the upper end of the part 68 and has the bevel or miter gear 72 rigidly secured to it and adapted to mesh with the bevel or miter gear 71 previously specified.

The part 75 (Fig. 25) has an opening 75ᵇ as shown, in its upper surface and an opening 75ᶜ which is provided with a cover 76. The opening 75ª provides accommodation for the steering function of the car. A glass plate 77 fits inside the casing member 75 and provides transparent closure for the opening 75ᵇ. A dial 78, which is adapted to fit inside the part 75, has an upward flange by which it is secured in and to the said part 75.

This upward flange on the dial 78 abuts against the under side of the glass plate 77 and serves to hold it in place. A thin sound insulation material is provided between the parts 75 and 77 and also between the parts 77 and 78 to prevent any possible rattle. A slot 75ᵈ shaped as shown is provided in the casing 75.

The control lever member 79 is rigidly secured to the upper end of the transmission control shaft 73.

The control lever member 80 is pivotally mounted in the other control lever member 79 by means of a pin or bolt 81 and it has a handle portion by which it is operated. A leaf spring (or a compression spring) 82 is interposed between the part 79 and a projection 80ª on the part 80. A recess of proper shape is provided in the part 79 to accommodate the said spring 82.

A suitable lug 80ᵇ is provided on the part 80 and it is adapted to abut against a projection on the part 79 and limit the movement of the lever handle member 80 in the part 79 under impulse of the spring 82.

The dial 78 is graduated as shown and has the words reverse, neutral, low, first intermediate (abbreviated first int.), second intermediate (abbreviated second int.) and high at the proper points thereon. An indicator hand 86 is secured to the control lever member 79 and it is adapted to point to the marks on the dial 78.

The handle portion of the part 80 may be of a wide variety of shapes to suit individual tastes.

The part 80 of the transmission control lever is adapted to travel freely in the slot 75ᵈ as far as the point marked "Neutral". When the operator of the car desires reverse motion thereof, he presses down on the handle of the control lever and pulls it backward in the slot 75ᵈ so that the indicator points to "Reverse" on the dial 78. This offset in the slot 75ᵈ is for the purpose of preventing the operator of a motor car from inadvertently moving the control lever to the "Reverse" point at an improper time.

Bottom plate 84 is put in place in the casing 75 after the other parts are assembled therein and it is held in place by any suitable means such as screws.

The cover plate 76 for the opening 75ᶜ of the indicator casing 75 has, on its under surface, provision for a small electric bulb, for the purpose of illuminating the dial 78 and it also has a reflector 76ª on its under surface as an aid in the illuminating of the dial 78.

Electric wiring for this light 85 is routed down through the steering column 74 and properly connected to the lighting circuit of the car. The said cover 76 is held in place on the indicator casing 75 by flush screws and it serves as a convenient method of replacing the electric bulb 85 when necessary.

The parts 74, 75, 76, 78, 80 and 86 are to be finished to suit individual tastes and in harmony with the interior of different cars equipped with the invention.

An air-compressor 87 (preferably the vertical type) is mounted in a suitable location to receive power directly from the engine of the motor car.

Compressed air is piped therefrom to a storage tank 88 of suitable size. The said storage tank 88 is connected by piping to the pressure regulator 89, which is adapted to regulate the air pressure in the storage tank.

The air chamber 59ᶜ of the transmission air valve (Fig. 23) is connected by piping to a cylinder 62 suitably located and mounted. In this cylinder 62 is mounted a piston similar to the piston 33 and a compression spring of proper strength is mounted on the piston-rod 95 between the piston and the cylinder head through which the said piston-rod moves. The piston-rod 95 is suitably connected to a lever 94, which is adapted to cause (in cooperation with other parts of the invention) the engagement or disengagement of the car's clutch instead of the clutch pedal now in use.

The pressure regulating members 89 etc. may be of similar makeup to the said clutch operating members 62 etc. In explanation of the pressure regulating function and referring to Figures 31 and 36, the compressed air storage tank 88 is connected by a pipe to the cylinder 89, which is secured to the air compressor 87. A piston 93 provided with a piston ring is mounted rigidly on the piston rod 96 and the said piston rod travels in a bearing in the open end cap 97. A compression spring 98 is mounted on the piston rod 96 between the piston 93 and the bearing in the open end cap 97.

The lever 90 is pivotally mounted on the side of the air compressor 87 and has one end adapted to cause the engagement or disengagement of the air compressor clutch members 91 and 92. The other end of the said lever 90 is slotted and connected to the piston rod 96 by a pin in the piston rod fork 99.

The spring 98 is selected of such a strength that when the air pressure in the storage tank 88 and consequently in the cylinder 89 exceeds the desired limit the air compressor ceases to operate until the pressure in the said storage tank drops slightly below the pressure desired to be maintained.

The diameters of the gears 72, 71, 70, 96, 54 and 52 are such that when the indicator 86 on the control lever points to any mark on the dial 78, the port 51c of the compressed air distributor 51 will register with the proper port in the port plate 4 of the distributor casing and consequently, compressed air will be admitted into the proper cylinder of the transmission.

When compressed air is admitted to any of the cylinders in the transmission, the proper clutch on the countershaft 10 is thrown into engagement by the operation of the piston etc. under impulse of the compressed air and the operator gets the speed or condition to which the indicator 86 points on the dial 78.

When any of the pistons moves forward under impulse of the compressed air, the roller on the roller block of the moving piston rod enters and travels in its allotted groove in the part 42. The shape of all the grooves in the said part 42 is the same and is such that when any of the pistons travels forward, the part 42 is caused to swing properly on the spindle on which it is mounted. The transmission air valve (Fig. 18 etc.) is properly operated by the said part 42 through the medium of its arm 42a and the parts 64 and 65.

When this part 42 is caused to swing by any of the pistons traveling forward, it is not possible for another piston to travel forward until the former piston has completely returned to its rearward limit.

When the operator of the car moves the control lever so that the indicator points to another point on the dial 78, the air pressure is removed from the former piston and is applied to another. The part 42 makes it impossible for more than one piston to be forward at the same time, for as soon as one piston moves forward, the consequent swing of the part 42 causes all of the other grooves in the said part 42 to move out of registry with all of the other rollers.

When the air pressure is removed from any one of the cylinders, the piston, etc., affected are free to return to their rearward limit under impulse of their compression spring. At the same time the corresponding gear on the countershaft ceases to be in effective action through the consequent disengagement of its jaw-clutch.

When the indicator 86 is caused to point to "Neutral" on the dial 78, the port 51c of the compressed air distributor 51 is out of registry with all of the cylinder ports and the main clutch of the car is in released condition. This condition is accomplished by the fact that at that time, all of the pistons are at their rear limits and the transmission air valve (Figs. 18, 19, etc.) has been caused, through the medium of the parts 42, 64, 65 and 66, to admit compressed-air into the cylinder 62.

It is so arranged that when compressed-air enters the cylinder 62 the main clutch of the car is released by the consequent action of the parts 94 and 95.

The same action occurs momentarily whenever the control lever is moved to a different point and the disengagement of any of the small jaw-clutches on the countershaft is thereby facilitated.

When any of the pistons is at its forward limit and one of the gears 23, 24, 25, 26 or 27 is consequently in effective action, the compressed-air valve (Fig. 18, 19, etc.) on the transmission casing is caused, through the medium of the parts 42, 64 and 65, to release the air pressure in the cylinder 62.

This action causes the main clutch of the motor car to be thrown into engaged condition.

Compressed air from the storage tank is also to be used to operate the brakes of the car.

A small and easily operated foot pedal 100 (Figure 37) is pivotally mounted in a frame-shaped part 101, which in turn is neatly and substantially secured in and to the foot board of the car body. This foot pedal 100 is shaped as indicated by Figures 32 and 37 and has an arm 100a with an eye in which one end of a tension spring 102 is adapted to be hooked.

The frame-shaped part 101 in which the pedal 100 is pivotally mounted has flanges to accommodate the use of screws by which it is secured to the said foot board of the car body and it also has an arm 101a provided with an eye in which the other end of the tension spring 102 is adapted to be hooked.

Figure 19:
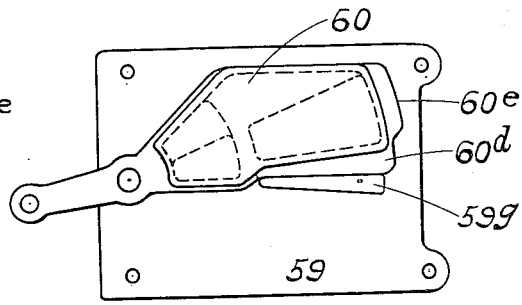
Fig. 19 is a like view of said stationary part of the said air valve and showing the pivoted part thereof in place.
Figure 20:
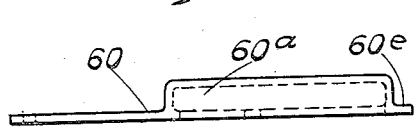
Fig. 20 is a side elevation of the pivoted part of the transmission air valve.
Figure 21:
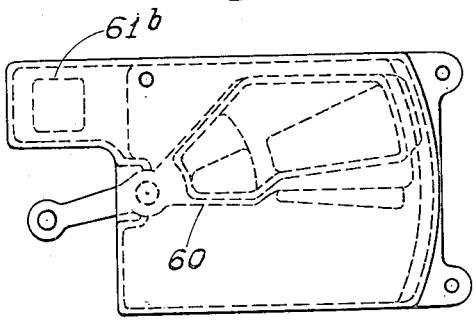
Fig. 21 is a plan view of the said transmission air valve with its cover in place.
Figure 22:
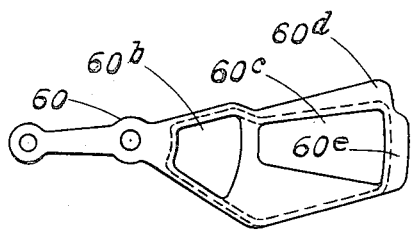
Fig. 22 is a view of the under side of the pivoted member of the said air valve showing the ports therein.
Figure 23:
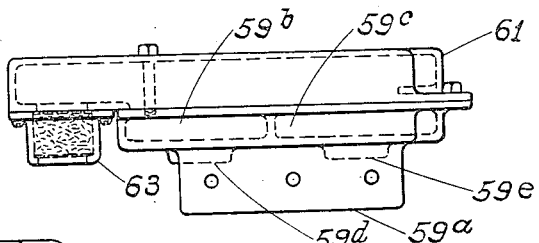
Fig. 23 is a side elevation of the said air valve with the pivoted member thereof omitted.
Figure 24:
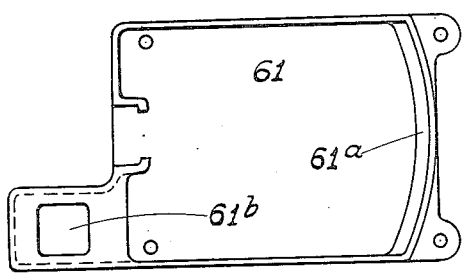
Fig. 24 is a view of the under side of the transmission air valve cover.

An air valve 103 similar to that shown by Figures 18, 19, etc., except as to the location of the pipe or tube connections thereto, is also secured to the foot board of the car body. Its arm 103a by which it is operated is connected to the arm 100a of the foot pedal 100 by means of a swivel part 104 and the link 105 the length of which may be varied to suit conditions in different motor cars.

A cylinder 106 is adapted to be secured to one of the frame members of the car chassis. A piston 107 provided with a piston ring is secured to the piston rod 108 which is adapted to travel in a bearing in the open end cap 109.

A compression spring 110 of a strength suitable for the purpose is mounted on the piston rod 108 between the piston 107 and the said open end cap 109.

The air entry port of the valve 103 is connected by piping to the compressed air storage tank 88, while the air exit port of the said valve is connected by piping to the cylinder-head 111 of the cylinder 106.

A shaft 112 is rotatably mounted in bearings secured to the side frame member of the car chassis. A lever 113 is fixedly secured to the said shaft 112. The end of the piston rod 108 has fixedly secured to it a fork 114, and a link 115 connects it with the lever 113.

On each end of the shaft 112 and outside the frame side members of the car chassis are fixedly secured levers 116, and these are connected to the brake band operating levers by links 117 of proper length.

An arrangement of parts similar to those just described for the operation of the emergency brakes is also provided for the operation of the service brakes of the motor car.

As an added factor of safety, I also provide the customary emergency lever for the operation of the emergency brakes. The said emergency lever 119 (Figure 37) is pivotally mounted on a suitable bracket 124 secured to a frame member of the car chassis or to the transmission casing or to both. This lever 119 is provided with the customary hand-trigger 120, trigger rod 121, pawl 122, and pawl spring 123, and the bracket 124 has a ratchet-stand formed with or secured to it to accommodate the said pawl 122 in holding the said emergency lever 119 in different desired positions.

A link 126 connects the emergency lever 119 with the lever 125, which is fixedly mounted on the shaft 112. The said link 126 has a slot at one end through which it is connected so that it will not impede the action of the parts when they are being operated through the medium of compressed air.

A suitable connection is to be provided (Figure 34) on the storage tank 88 for an air hose of proper size and length to serve in the inflation of the tires of the motor car and for other possible uses.

Pressure reducing means are to be used in any of the air lines leading from the storage tank 88 if required for the best operation of any of the parts.

I reserve the right to use ball-bearings wherever desirable and more especially for the shatfs 73, 69 and 53.

The several clutch shifters 32 are to have antifriction means (balls or rollers) in their mounting on the rods 44, 45, 46, 47 and 48 and the slide bearings 3b, 3c etc. for the said rods are to be as near frictionless as possible.

Suitable means of lubrication for the various working parts are to be used in securing endurance of the parts as well as smooth and silent operation thereof.

I have shown ordinary gearing in the transmission etc. but reserve the right to use whatever forms of gear teeth that are practical for the purpose and will secure maximum silence in operation.

I reserve the right to use different shapes of teeth if desirable for the small jaw clutch members on the countershaft.

I also reserve the right to omit the pawls 13 and internal ratchet wheel 12 if desired and rigidly secure the gear 11 or other driving means to the counter-shaft, the said parts being used for the purpose of securing silence in operation.

What I claim as new, and desire to secure by Letters Patent, is—

1. In a motor car transmission controllable through the medium of a pressure fluid, a transmission casing, a countershaft rotatably supported in said casing, an arcuate series of open ended cylinders in said casing, substantially parallel to, and equidistant from said countershaft, a piston for receiving fluid pressure in each of said cylinders, a piston rod on each piston, a bearing for each piston rod in said casing and in which it is slidably supported, parallel to said countershaft, means for preventing any rotation of said piston rods in the bearings in which they are slidably supported, a clutch shifter associated with each piston rod, a regulator for automatically preventing the simultaneous movement of more than one piston, and comprising a substantially cylindrical part rotatably supported at its axis, the said regulator being substantially concentric with said countershaft, a plurality of like grooves or equivalent means in or on the lateral surface of said regulator, each having two high pitch spiral portions with an axial portion therebetween, a roller rotatably supported on each of said piston rods and adapted to enter and travel in one of said grooves, a base or plane surface on said regulator and adapted for contact with the lateral surface of all of said rollers when all of said pistons are at rest, the said surface being adapted, during the cooperation of said regulator with any one of said rollers, to prevent the rectilinear travel of all of the other rollers, and means for retaining said regulator in operative relation to said rollers.

2. The invention defined by claim 1 together with a main clutch control pressure fluid valve secured to said casing, an actuator arm on said regulator, a slot in said casing to accommodate the movement of said arm, an arm on said valve by which it can be actuated, a swivel connector on said valve actuating arm, resilient means connecting said swivel connector to said casing, means for operatively connecting said swivel connector to said actuator arm, and means residing in the direction of trend of a portion of each of said grooves in said regulator, relative to the direction of travel of the piston rod roller which is adapted to travel therein, whereby said valve is properly actuated, and the movements thereof are properly synchronized with the movements of any of said pistons and their associated members in said casing.

3. In a power transmission operable by, or controllable through the medium of a pressure fluid, a transmission casing, a plurality of cylinders in said casing, a piston for receiving fluid pressure in each of said cylinders, a piston rod on each piston, a bearing for each piston rod in said casing and in which it is slidably supported to accommodate piston travel, a regulator operatively supported in said casing for prohibiting the simultaneous travel of more than one piston, roller carrying means cooperable with said regulator and also with each of said piston rods and means associated with said casing for limiting the movement of said piston rods and roller carrying means.

4. In a power transmission operable by, or controllable through the medium of a pressure fluid, a casing, a countershaft rotatably supported in said casing, a plurality of cylinders in said casing, a piston for receiving fluid pressure in each of said cylinders, a piston rod on each piston, a bearing for each piston rod in said casing and in which it is slidably supported to accommodate piston travel, a clutch shifter associated with each piston rod, access means in said casing for said piston rods and their associated clutch shifters, closure means for said access means, means associated with said casing or said closure means for limiting the movements of said piston rods and their associated clutch shifters, a plurality of shiftable jaw-clutch members on said countershaft, each adapted to be shifted by one of said clutch shifters and to secure in cooperation with other members in said casing, a different speed or direction of motion, means for selectively applying fluid pressure to said pistons for the purpose of shifting a selected jaw-clutch on the countershaft, regulating means for automatically prohibiting the simultaneous engagement of more than one jaw-clutch on the countershaft, and means for automatically causing the disengagement of a selected jaw-clutch as soon as the fluid pressure on the piston retaining the engagement thereof is automatically released by a different selection with said selective fluid pressure applying means.

5. In an automobile transmission operable by, or controllable through the medium of a pressure fluid, a casing, a plurality of cylinders in said casing, a piston for receiving fluid pressure in each of said cylinders, a piston rod on each piston, a clutch shifter on each piston rod and in slidable relation thereto, shifter engaging means on each of said piston rods, a bearing for each piston rod in said casing and in which it is slidably supported to accommodate piston travel, roller carrying means connected with each of said piston rods and adapted for reciprocating movement in said casing, access means in said casing for said clutch shifters and shifter engaging means, closure means for said access means, means associated with said casing or said closure means for limiting the movements of each of said pistons, clutch shifters, and roller carrying means, a regulator operatively supported in said casing for automatically prohibiting the simultaneous travel of more than one piston, a plurality of grooves or equivalent means in or on the surface of said regulator, a roller rotatably supported on each of said roller carrying means and adapted to enter and travel in one of said grooves, a surface on said regulator adapted for contact with the lateral surface of all of said rollers when all of said pistons are at rest, the said surface being adapted, during the cooperation of said regulator with any one of said rollers, to prevent the rectilinear travel of all of the other rollers, and means for retaining said regulator in operative relation to said rollers.

6. The invention defined by claim 5 together with a drive shaft, rotatably supported in said casing, a countershaft also rotatably supported in said casing, means by which the countershaft is driven by the drive shaft, a main or friction clutch operatively connected to said drive shaft and adapted to transmit the driving energy of the engine thereto, a plurality of jaw-clutches on the countershaft, each adapted to be engaged and disengaged by one of said clutch shifters, motion escapement means between the clutch shifter on each of said piston rods and the shifter engaging means on each of said rods, fluid pressure operable releasing means for said main clutch, resilient engaging means for said main clutch and cooperable with said releasing means, selective control means accessible to an operator and cooperable with said shifting means for causing the engagement of a selected jaw-clutch on the countershaft for the purpose of securing, in cooperation with other members in said casing, a selected speed or direction of motion and also for retaining same until a different speed or direction of motion is selected, an actuator arm on said regulator, a main clutch control pressure fluid valve, an arm on said valve by which it can be actuated, means for operatively connecting said actuator arm to said valve actuating arm, means for supplying pressure fluid to said shifting means and through said valve to said main clutch releasing means, means by which any of said jaw-clutches in effective driving engagement is automatically released as soon as the fluid pressure retaining the engagement thereof is released by a different selection being made with said selective control means, and means residing in said regulator, valve, and motion escapement means and their cooperation and cooperating members, whereby said main clutch is automatically released preceding each jaw-clutch disengagement and automatically engaged subsequent to each jaw-clutch engagement.

7. In a motor car transmission controllable through the medium of a pressure fluid, a transmission casing, access means for said casing, closure means for said access means, a countershaft rotatably supported in said casing, a plurality of shiftable jaw-clutch members thereon for getting, in cooperation with other members in said casing, different car speeds or direction of motion, an arcuate series of open ended cylinders in said casing, whose axes are substantially parallel to, and equidistant from said countershaft, a piston for receiving fluid pressure, in each of said cylinders, a piston rod on each piston, a bearing for each piston rod in said casing and in which it is slidably supported parallel to said countershaft, means for preventing any rotation of said piston rods in the bearings in which they are slidably supported, a clutch shifter slidably mounted on each of said piston rods and adapted to anti-frictionally shift one of the jaw-clutch members on the countershaft, means on each of said piston rods for engaging the clutch shifter thereon for the purpose of causing the engagement and disengagement of one of the jaw-clutches on the countershaft, means on each of said piston rods for storing power during the clutch engaging stroke of the fluid pressure impelled piston, the said stored power serving to disengage said clutch as soon as the fluid pressure on the piston is released, motion escapement means between the clutch shifter on each of said piston rods and the shifter engaging means on each of said rods, regulating means whereby the simultaneous operation of more than one piston and the consequent simultaneous engagement of more than one clutch on the countershaft is prevented, and means associated with the casing or its access closure means for limiting the movement of said pistons and clutch shifters.

8. The invention defined by claim 7 together with a pressure fluid control valve secured to the transmission casing, an operating arm on said valve, actuating means combined with said regulating means, means for operatively connecting said actuating means with the said valve operating arm, resilient means connecting said connecting means to said casing and means residing in said regulating means, actuating means, motion escapement means, and clutch shifting means and their cooperation whereby the said valve is operated automatically and synchronously with the movement of any piston and the consequent engagement of any clutch in the transmission.

9. The invention defined by claim 7 together with a pressure fluid distributor casing and its port-plate which is adapted to cover the outer open ends of the cylinders in the transmission casing, a plurality of ports in said port plate, each adapted to serve as a port for one of the cylinders in the transmission casing, a pressure fluid distributor in said pressure fluid distributor casing and adapted not only to introduce pressure fluid directly into any of the cylinders in the transmission casing, but also to release it at the proper time, selective means accessible to an operator and cooperable with said pressure fluid distributor for shifting any desired clutch in the transmission casing, through the pressure fluid medium, and means associated with said selective means for preventing inadvertent and improper use thereof and consequent harmful results in the transmission.

10. The invention defined by claim 8 together with a drive shaft rotatably supported in said transmission casing, means by which the said countershaft is driven by the drive shaft, a main or friction clutch operatively connected to said drive shaft and adapted to transmit the driving energy of the motor or engine thereto, and fluid pressure operable means and resilient means cooperable therewith in connection with pressure fluid supply means, said main clutch and said pressure fluid control valve to enable said main clutch to be automatically controlled synchronously with the engagement and disengagement of any of the jaw-clutches on the countershaft.

11. In a motor car, the combination with a transmission controllable through the medium of a pressure fluid and a main clutch automatically controlled thereby through the pressure fluid medium, of pressure fluid storage means, means for producing pressure fluid, pressure regulating means for regulating the pressure of pressure fluid in said pressure fluid storage means, so as to maintain a desired and predetermined pressure therein, means by which the said pressure fluid producing means is controlled by the said pressure regulating means, a pressure fluid valve associated with said transmission relative to the said automatically controlled main clutch, pressure fluid distributing means also associated with said transmission and including a chamber for receiving pressure fluid, and means for supplying pressure fluid from said storage means to the said pressure fluid valve and the said pressure fluid distributing means.

ELMER EIDEMILLER MOTTER.